(12) United States Patent
Hwang et al.

(10) Patent No.: US 8,994,897 B2
(45) Date of Patent: Mar. 31, 2015

(54) REFLECTIVE LIQUID CRYSTAL DISPLAY DEVICE AND METHOD FOR MANUFACTURING THE SAME

(75) Inventors: Hyun Ha Hwang, Seoul (KR); Seung Gon Kang, Hwaseong-si (KR); Heon Kyu Kim, Suwon-si (KR)

(73) Assignee: Intellectual Discovery Co., Ltd., Seoul (KR)

( * ) Notice: Subject to any disclaimer, the term of this patent is extended or adjusted under 35 U.S.C. 154(b) by 300 days.

(21) Appl. No.: 13/459,692

(22) Filed: Apr. 30, 2012

(65) Prior Publication Data

US 2012/0274886 A1 Nov. 1, 2012

(30) Foreign Application Priority Data

Apr. 29, 2011 (KR) .......................... 10-2011-0040562

(51) Int. Cl.
*G02F 1/1347* (2006.01)
*G02F 1/1335* (2006.01)

(52) U.S. Cl.
CPC ...... *G02F 1/13476* (2013.01); *G02F 1/133512* (2013.01); *G02F 2001/13478* (2013.01); *G02F 2201/52* (2013.01)
USPC ................. 349/78; 349/74; 349/77; 349/139; 349/156; 349/175; 349/176

(58) Field of Classification Search
USPC ................. 349/74, 77, 78, 139, 156, 175, 176
See application file for complete search history.

(56) References Cited

U.S. PATENT DOCUMENTS

| 6,654,080 | B1 | 11/2003 | Khan et al. |
| 6,750,928 | B2 * | 6/2004 | Hiji et al. .......................... 349/74 |
| 7,864,285 | B2 | 1/2011 | Liao et al. |
| 2010/0214515 | A1 * | 8/2010 | Hsieh .............................. 349/113 |
| 2012/0092576 | A1 * | 4/2012 | Nose ................................ 349/33 |

FOREIGN PATENT DOCUMENTS

| JP | 2000-227606 | 8/2000 |
| JP | 2010-039038 | 2/2010 |
| JP | 2011-043777 | 3/2011 |
| KR | 1020110014904 | 2/2011 |

OTHER PUBLICATIONS

International Search Report for International Application No. PCT/KR2012/003061 Dated Nov. 7, 2012, 2 pgs.

* cited by examiner

*Primary Examiner* — Lucy Chien
(74) *Attorney, Agent, or Firm* — Amin, Turocy & Watson, LLP

(57) ABSTRACT

There is provided a reflective liquid crystal display device including a first liquid crystal panel containing a first liquid crystal material that reflects light of a first color, a second liquid crystal panel containing a second liquid crystal material that reflects light of a second color and a third liquid crystal material that reflects light of a third color, the second and third liquid crystal materials positioned to be distinct from each other, and a light absorption layer that is bonded to a lower surface of the second liquid crystal panel, wherein the second liquid crystal panel is bonded to a lower surface of the first liquid crystal panel, and the first to third liquid crystal materials reflect light in a planar state and transmit light in a focal conic state.

20 Claims, 9 Drawing Sheets

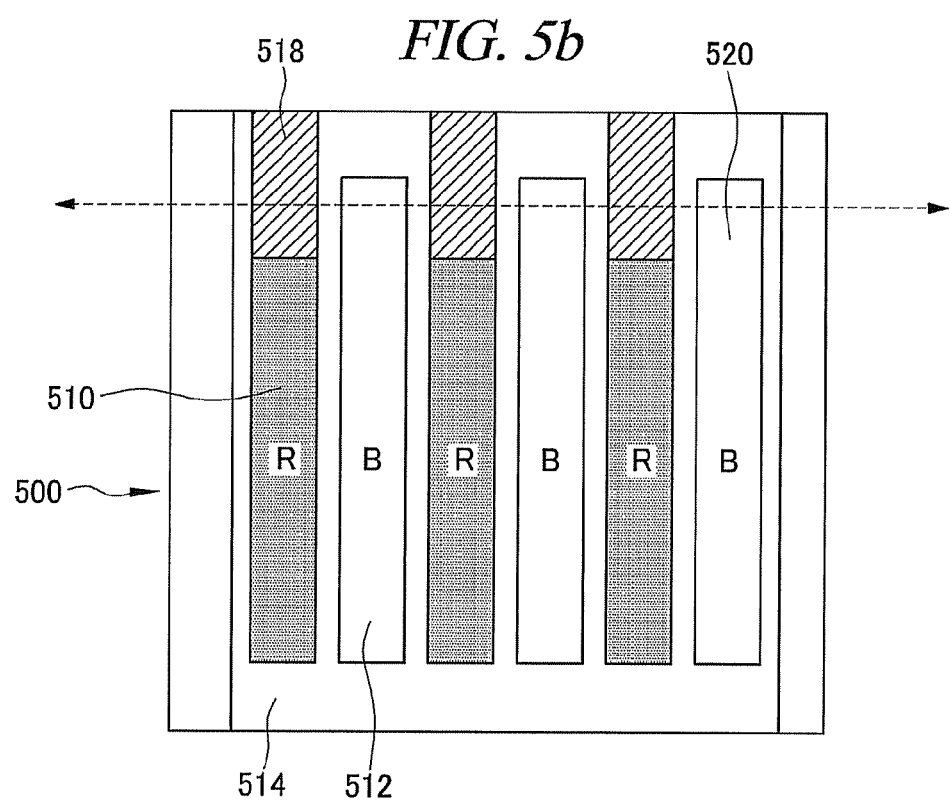

REFLECTIVE LIQUID CRYSTAL DISPLAY DEVICE AND METHOD FOR MANUFACTURING THE SAME

CROSS-REFERENCE TO RELATED APPLICATION

This application claims the benefit of Korean Patent Application No. 10-2011-0040562 filed on Apr. 29, 2011, the entire disclosures of which are incorporated herein by reference.

TECHNICAL FIELD

The present disclosure relates to a reflective liquid crystal display device and a method for manufacturing the same. More specifically, the present disclosure relates to a reflective liquid crystal display device capable of displaying colors and a method for manufacturing the same.

BACKGROUND

A cholesteric crystal display device may form a planar texture that reflects extraneous light or a focal conic texture that absorbs extraneous light depending on an application state of an electric field. Even if an electric field is not maintained in a certain state, the cholesteric crystal display device can maintain such a state due to its bistability. Therefore, the cholesteric crystal display device with bistability has been used as an electronic paper display device.

The cholesteric crystal display device can display various colors depending on a pitch of molecules contained in a liquid crystal layer and a wavelength of incident light. There has been known Patent Document 1 (U.S. Pat. No. 6,654,080 entitled "Stacked color liquid crystal display device") in which three or more liquid crystal layers displaying different colors are stacked in a cholesteric crystal display device for displaying colors. Further, there has been known Patent Document 2 (U.S. Pat. No. 7,864,285 entitled "Color cholesteric liquid crystal display device comprising a unitary structure having a plurality of stripe wall structures, a straight seal line, and a solid bulk region made of a same material") in which colors are displayed by forming R, G, and B patterns on the same plane.

In a method described in Patent Document 1, each of the stacked layers reflects light. Thus, the method of Patent Document 1 has an advantage of high light reflectivity over a method described in Patent Document 2. However, the method of Patent Document 1 has a disadvantage in that numerous electrodes and driver ICs are needed to drive the stacked layers. Further, the method of Patent Document 1 has another disadvantage in that three or more liquid crystal panels need to be manufactured individually and stacked to be suitable for respective pixels, and, thus, a manufacturing process is complicated. The method of Patent Document 2 has a disadvantage in that three colors are displayed on the same plane and an area assigned to each color is small, and, thus, reflectivity and an aspect ratio are decreased.

SUMMARY

In view of the foregoing, illustrative embodiments provide a reflective liquid crystal display device having a simple structure and capable of displaying colors. In this regard, the present disclosure provides a reflective liquid crystal display device capable of improving color display performance.

Further, the illustrative embodiments provide a method for manufacturing the reflective liquid crystal display device.

In accordance with a first aspect of the illustrative embodiments, there is provided a reflective liquid crystal display device including a first liquid crystal panel containing a first liquid crystal material that reflects light of a first color, a second liquid crystal panel containing a second liquid crystal material that reflects light of a second color and a third liquid crystal material that reflects light of a third color, the second and third liquid crystal materials positioned to be distinct from each other, and a light absorption layer that is bonded to a lower surface of the second liquid crystal panel, wherein the second liquid crystal panel is bonded to a lower surface of the first liquid crystal panel, and the first to third liquid crystal materials reflect light in a planar state and transmit light in a focal conic state.

In accordance with a second aspect of the illustrative embodiments, there is provided a reflective liquid crystal display device including a first liquid crystal panel containing a first liquid crystal material that reflects light of a first color, a second liquid crystal panel containing a second liquid crystal material that reflects light of a second color and a third liquid crystal material that reflects light of a third color, the second and third liquid crystal materials positioned to be distinct from each other, and a light absorption layer that is bonded to a lower surface of the first liquid crystal panel, wherein the first liquid crystal panel is bonded to a lower surface of the second liquid crystal panel, and the first to third liquid crystal materials reflect light in a planar state and transmit light in a focal conic state.

In accordance with a third aspect of the illustrative embodiments, there is provided a manufacturing method of a reflective liquid crystal display device, the manufacturing method including (a) injecting, into a first liquid crystal panel, a first liquid crystal material that reflects light of a first color, (b) injecting, into a second liquid crystal panel having a space divided by a plurality of partition walls, a second liquid crystal material that reflects light of a second color and a third liquid crystal material that reflects light of a third color, and (c) bonding the second liquid crystal panel to a lower surface of the first liquid crystal panel.

In accordance with a fourth aspect of the illustrative embodiments, there is provided a manufacturing method of a reflective liquid crystal display device, the manufacturing method including (a) injecting, into a first liquid crystal panel, a first liquid crystal material that reflects light of a first color, (b) injecting, into a second liquid crystal panel having a space divided by a plurality of partition walls, a second liquid crystal material that reflects light of a second color and a third liquid crystal material that reflects light of a third color, and (c) bonding the second liquid crystal panel to an upper surface of the first liquid crystal panel.

In accordance with the illustrative embodiments, a reflective liquid crystal display device having a simple structure and capable of displaying colors can be provided. In particular, the reflective liquid crystal display device has a simple structure in which two liquid crystal panels are connected, and, thus, a manufacturing process can be simplified. Further, the number of stacked layers is decreased, and, thus, stability of the whole structure can be enhanced. Furthermore, as compared with a method of displaying three colors on the same plane, a cell area assigned to each color can be large and reflectivity and an aspect ratio can be enhanced.

BRIEF DESCRIPTION OF THE DRAWINGS

Non-limiting and non-exhaustive embodiments will be described in conjunction with the accompanying drawings. Understanding that these drawings depict only several embodiments in accordance with the disclosure and are, therefore, not to be intended to limit its scope, the disclosure will be described with specificity and detail through use of the accompanying drawings, in which:

FIGS. 5a to 5c illustrate a method of injecting a liquid crystal into a liquid crystal panel in accordance with an illustrative embodiment.

DETAILED DESCRIPTION

Figure 1:
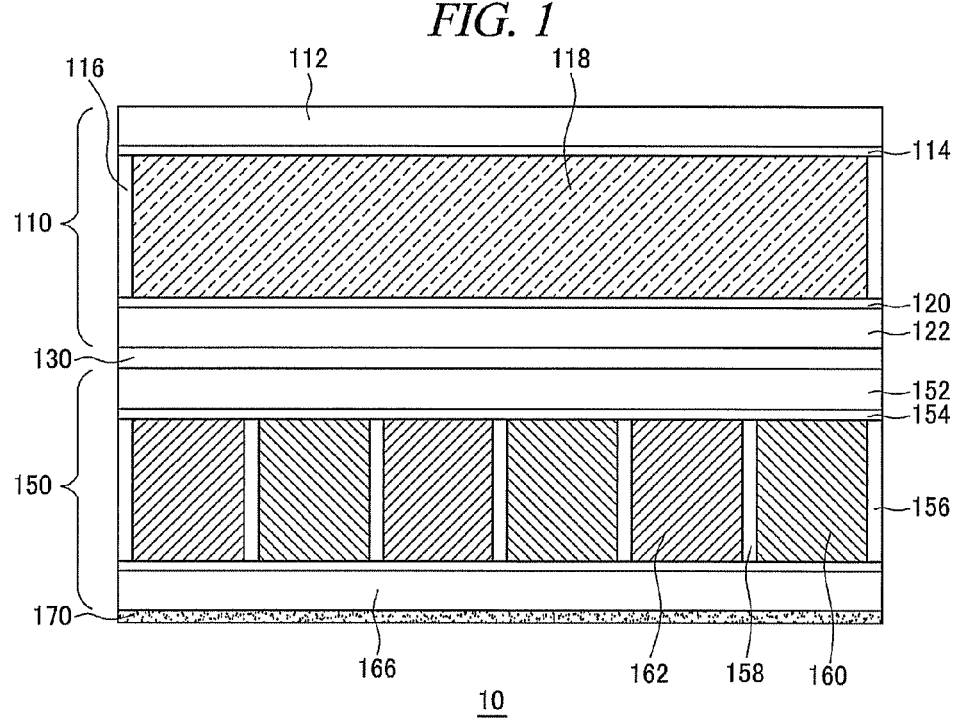
FIG. 1 is a cross-sectional view showing a configuration of a reflective liquid crystal display device in accordance with an illustrative embodiment.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the terms "connected to" or "coupled to" that is used to designate a connection or coupling of one element to another element includes both a case that an element is "directly connected or coupled to" another element and a case that an element is "electronically connected or coupled to" another element via still another element. Further, the terms "comprises or includes" and/or "comprising or including" used in the document means that one or more other components, steps, operation and/or existence or addition of elements are not excluded in addition to the described components, steps, operation and/or elements unless context dictates otherwise.

FIG. 1 is a cross-sectional view showing a configuration of a reflective liquid crystal display device in accordance with an illustrative embodiment.

A reflective liquid crystal display device 10 includes a first liquid crystal panel 110 containing a liquid crystal material 118 that reflects light of a first color, a second liquid crystal panel 150 containing a liquid crystal material 160 that reflects light of a second color and a liquid crystal material 162 that reflects light of a third color, an adhesive layer 130 that sticks the first liquid crystal panel 110 and the second liquid crystal panel 150 together, and a light absorption layer 170 that is bonded to a lower surface of the second liquid crystal panel 150 and absorbs light.

The first liquid crystal panel 110 includes an upper substrate 112, a lower substrate 122, an upper electrode 114 bonded to the upper substrate 112, a lower electrode 120 bonded to the lower substrate 122, a liquid crystal material 118 filling a gap between the two electrodes 114 and 120, and side walls 116 that seals the liquid crystal material 118.

The liquid crystal material 118 may be in a planar state or a focal conic state depending on electric fields applied thereto from the upper electrode 114 and the lower electrode 120.

The adhesive layer 130 sticks the first liquid crystal panel 110 and the second liquid crystal panel 150 together. The adhesive layer 130 may be made of a transparent material such as an OCA (Optical Clear Adhesive) to transmit light.

The second liquid crystal panel 150 includes an upper substrate 152, a lower substrate 166, an upper electrode 154 bonded to the upper substrate 152, a lower electrode 164 bonded to the lower substrate 166, liquid crystal materials 160 and 162 each filling a gap between the two electrodes 154 and 164, side walls 156 that seals the liquid crystal materials 160 and 162, and partition walls 158 that separate the liquid crystal materials 160 and 162 from each other.

The respective substrates and electrodes included in the first liquid crystal panel 110 and the second liquid crystal panel 150 are made of a transparent material to transmit light.

The upper electrodes and the lower electrodes are arranged in the form of an array.

Figure 2:
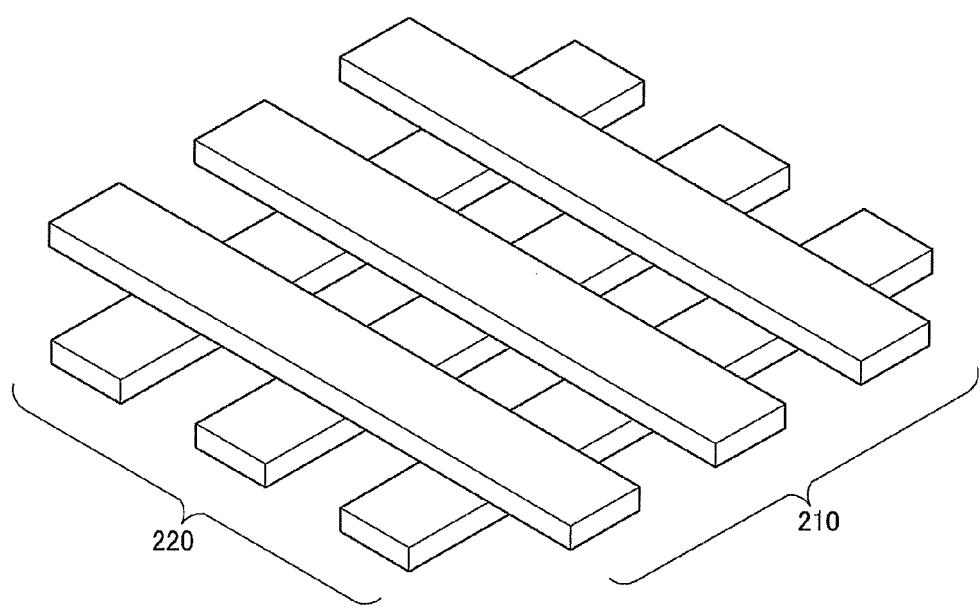
FIG. 2 illustrates a configuration of an electrode included in a liquid crystal panel in accordance with an illustrative embodiment.

FIG. 2 illustrates a configuration of an electrode included in a liquid crystal panel in accordance with an illustrative embodiment.

As described in FIG. 2, each of an upper electrode 210 and a lower electrode 220 includes a plurality of divided electrode lines. The upper electrode 210 and the lower electrode are spaced with a certain distance from each other and positioned to face each other. Further, an extended direction of the upper electrode 210 and an extended direction of the lower electrode 220 are crossed with each other.

A configuration of the electrodes can be applied commonly to the first liquid crystal panel 110 and the second liquid crystal panel 150.

Again, referring to FIG. 1, with respect to the incident light, the liquid crystal material 160 and the liquid crystal material 162 reflect lights of different colors. Further, the liquid crystal materials 160 and 162 may be in a planar state or a focal conic state depending on electric fields applied thereto from the upper electrode 114 and the lower electrode 120, respectively.

The light absorption layer 170 absorbs the light passing through the first liquid crystal panel 110 and the second liquid crystal panel 150. As the light absorption layer 170 absorbs the light, a black color is displayed.

A color display of the reflective liquid crystal display device can be carried out according to the following method.

By way of example, the first liquid crystal material 118 reflects green light, the second liquid crystal material 160 reflects blue light, and the third liquid crystal material 162 reflects red light.

In order to display a green color, an electric field is applied to the first liquid crystal material 118 in a corresponding pixel to be in a planar state and an electric field is applied to the second liquid crystal material 160 and the third liquid crystal material 162 to be in a focal conic state. Then, of incident visible light, only light of a wavelength to display a green color is reflected to the outside and light of other wavelengths is absorbed into the light absorption layer 170.

Likewise, in order to display a blue color, an electric field is applied to the second liquid crystal material 160 to be in a planar state and an electric field is applied to the other liquid crystal materials to be in a focal conic state. In order to display a red color, an electric field is applied to the third liquid crystal material 162 to be in a planar state and an electric field is applied to the other liquid crystal materials to be in a focal conic state. In order to display a white color, all the liquid crystal materials are set to be in a planar state, whereas in order to display a black color, all the liquid crystal materials are set to be in a focal conic state.

By setting the first liquid crystal material 118 and the second liquid crystal material 160 to be in a planar state or by setting the first liquid crystal material 118 and the third liquid crystal material 162 to be in a planar state, light reflected from the two liquid crystal materials can be displayed to the outside.

Further, by setting the first liquid crystal material 118 to be in a focal conic state and the second liquid crystal material 160 and the third liquid crystal material 162 to be in a planar state, light reflected from the two liquid crystal materials can be displayed to the outside.

With this configuration, an aspect ratio and reflectivity can be enhanced as compared with a case where three kinds of liquid crystal materials are arranged on the same plane to display. This is because when liquid crystal materials are stacked, the respective liquid crystal materials have larger areas as compared with a case where three kinds of liquid crystal materials are arranged in a limited area. In particular, a specific liquid crystal material has an area twice as large as areas of the other liquid crystal materials, and, thus, an aspect ratio and reflectivity of a color reflected from the specific liquid crystal material can be further enhanced.

Figure 3:
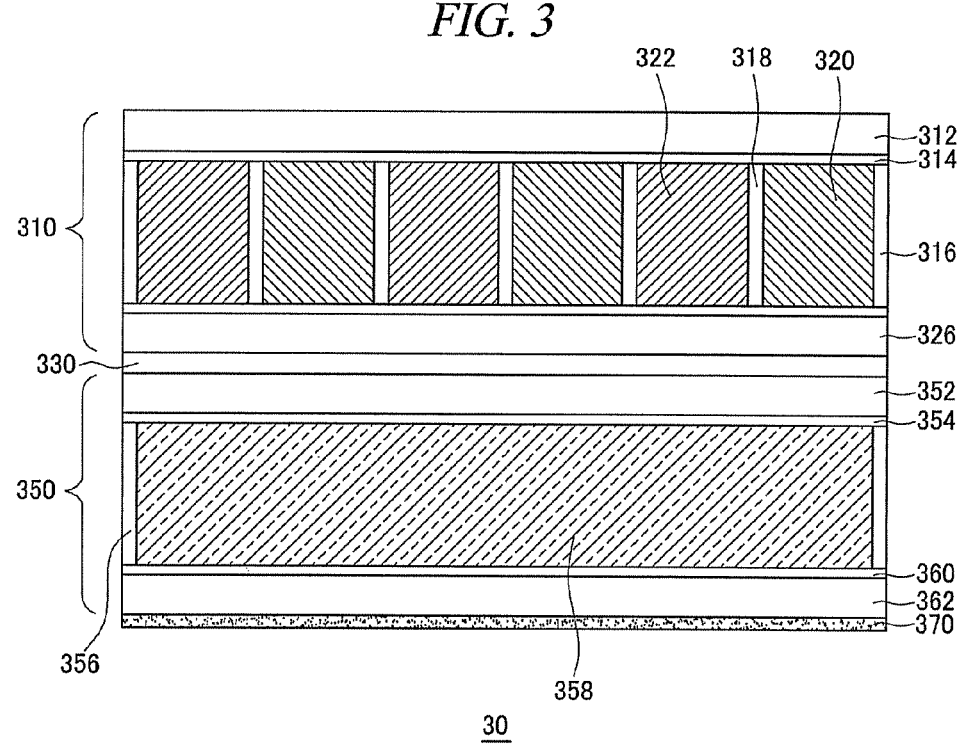
FIG. 3 is a cross-sectional view showing a configuration of a reflective liquid crystal display device in accordance with another illustrative embodiment.

FIG. 3 is a cross-sectional view showing a configuration of a reflective liquid crystal display device in accordance with another illustrative embodiment.

In the present illustrative embodiment, the liquid crystal panel depicted in FIG. 1 is upside down.

That is, a reflective liquid crystal display device 30 depicted in FIG. 3 includes a first liquid crystal panel 310 containing a liquid crystal material 320 that reflects light of a first color and a liquid crystal material 322 that reflects light of a second color, a second liquid crystal panel 350 containing a liquid crystal material 358 that reflects light of a third color, an adhesive layer 330 that sticks the first liquid crystal panel 310 and the second liquid crystal panel 350 together, and a light absorption layer 370 that is bonded to a lower surface of the second liquid crystal panel 350 and absorbs light.

A configuration of the first liquid crystal panel 310 corresponds to a configuration of the second liquid crystal panel 150 depicted in FIG. 1, and a configuration of the second liquid crystal panel 350 corresponds to a configuration of the first liquid crystal panel 110 depicted in FIG. 1. Therefore, a detailed description of the configuration will be omitted.

Figure 4:
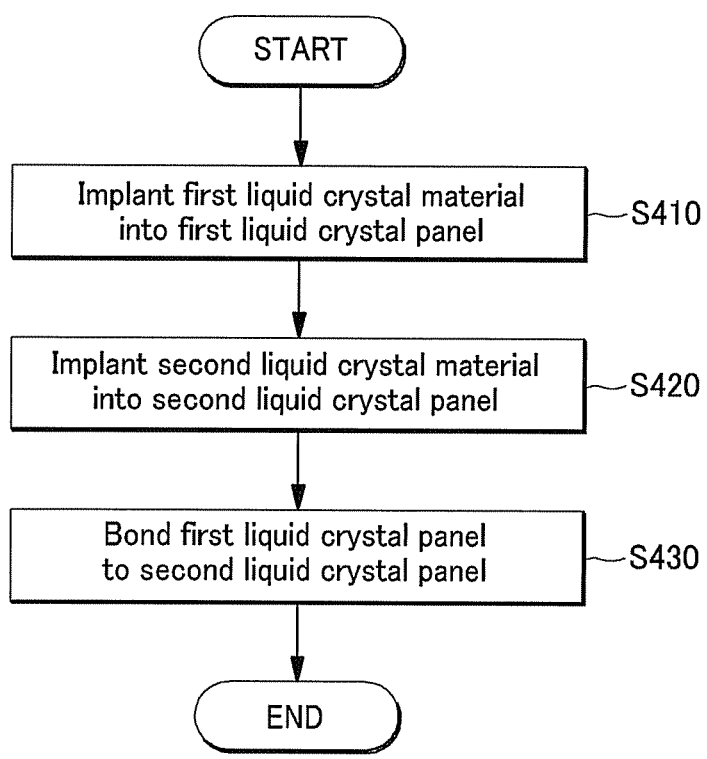
FIG. 4 illustrates a method for manufacturing a reflective liquid crystal display device in accordance with an illustrative embodiment.

FIG. 4 illustrates a method for manufacturing a reflective liquid crystal display device in accordance with an illustrative embodiment.

The first liquid crystal material 118 that reflects light of a first color is injected into the first liquid crystal panel 110 (S410). In this case, the first liquid crystal panel 110 includes the upper substrate 112, the lower substrate 122, the upper electrode 114 bonded to the upper substrate 112, and the lower electrode 120 bonded to the lower substrate 122.

By way of example, a process of stacking the upper electrode 114 on the upper substrate 112, a process of stacking the lower electrode 120 on the lower substrate 122, a process of forming the side wall 116 on one of the substrates on which the electrodes are stacked, and a process of bonding the upper substrate 112 to the lower substrate 122 may be performed first. Further, except an injection opening for injecting a liquid crystal material into the first liquid panel 110, the other parts are sealed with a sealant or the like. After the liquid crystal material 118 is injected into the first liquid panel 110, a process of sealing the injection opening is performed.

Then, the second liquid crystal material 160 that reflects light of a second color and the liquid crystal material 162 that reflects light of a third color are injected into the second liquid crystal panel 150 (S420). In this case, the second liquid crystal panel 150 includes the upper substrate 152, the lower substrate 166, the upper electrode 154 bonded to the upper substrate 152, the lower electrode 164 bonded to the lower substrate 166, and the partition walls 158 that separate the second liquid crystal materials 160 from the third liquid crystal material 162.

By way of example, a process of stacking the upper electrode 154 on the upper substrate 152, a process of stacking the lower electrode 164 on the lower substrate 166, a process of forming the partition walls 158 on one of the substrates on which the electrodes are stacked, and a process of bonding the upper substrate 152 to the lower substrate 166 may be performed first. Further, while injection openings for injecting the respective liquid crystal materials 160 and 162 are opened, the liquid crystal materials 160 and 162 are injected. Then, a process of sealing the opened injection openings is performed. A method of injecting two different liquid crystal materials will be explained in detail.

Thereafter, the first liquid crystal panel 110 is bonded to the second liquid crystal panel 150 (S430). In this case, the adhesive layer 130 that sticks the first liquid crystal panel 110 and the second liquid crystal panel 150 together may be made of a transparent material such as the OCA to transmit light.

At this time, a process of bonding the light absorption layer 170 to the lower surface of the second liquid crystal panel 150 may be performed. Before the first liquid crystal panel 110 is bonded to the second liquid crystal panel 150, the process of bonding the light absorption layer 170 to the second liquid crystal panel 150 may be performed.

The above-described manufacturing method is related to FIG. 1 and can be applied to FIG. 3.

Meanwhile, in order to improve the method of injecting two different liquid crystal materials into the liquid crystal panels 150 and 310, the following process may be performed.

Figure 5A:
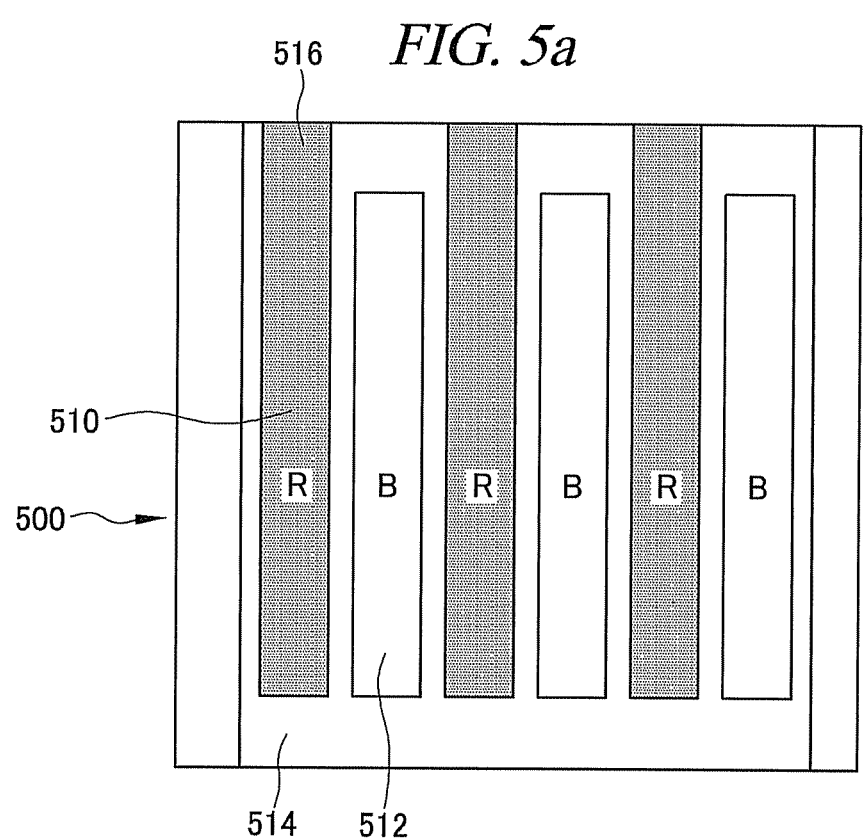
Figure 5C:
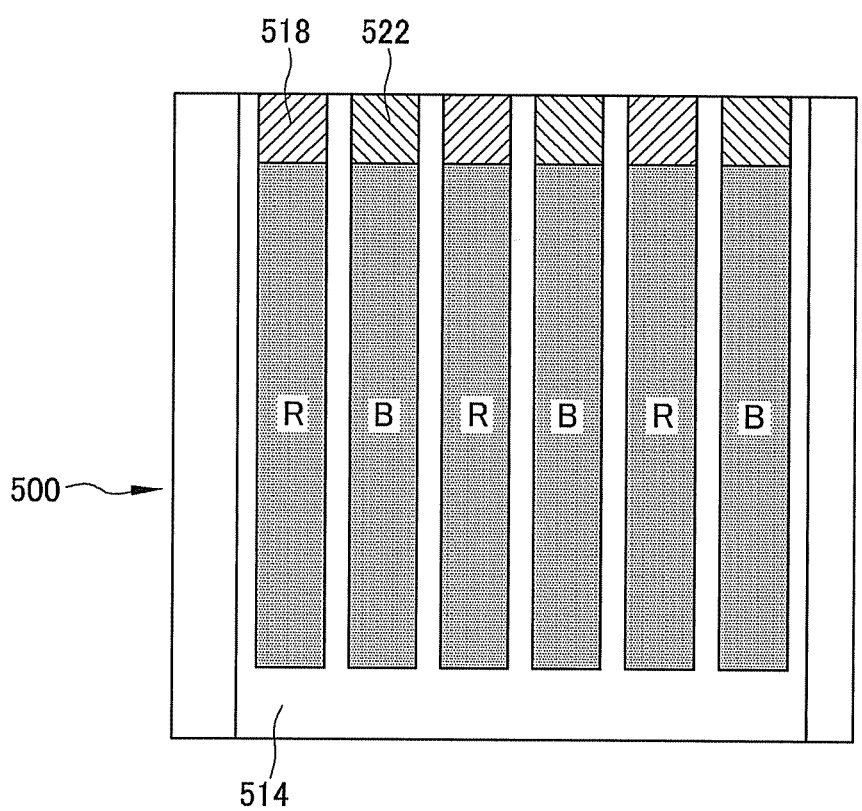

FIGS. 5a to 5c illustrate a method of injecting a liquid crystal into a liquid crystal panel in accordance with an illustrative embodiment.

A second liquid crystal panel 500 includes spaces 510 and 512 into which respective liquid crystal materials are to be injected. The spaces 510 and 512 are divided by a partition wall 514.

As depicted in FIG. 5a, a second liquid crystal material is injected through injection openings 516 of the spaces 510. In this case, the partition wall 514 is provided such that a length of the spaces 510 is longer than a length of the spaces 512, and, thus, the second liquid crystal material is injected into the spaces 510 only.

Then, as depicted in FIG. 5b, the injection openings 516 are sealed with a sealant 518, so that the second liquid crystal material is sealed. Thereafter, a part of the second liquid panel 500 is cut off, so that injection openings 520 of the spaces 512 into which a third liquid crystal material is to be injected are opened. At this time, in the cutting process, the sealant 518 may be cut off.

Then, as depicted in FIG. 5c, the injection openings 520 of the spaces 512 into which the third liquid crystal material is injected are sealed with a sealant 522, so that the third liquid crystal material is sealed. In this way, liquid crystal materials of different colors can be injected.

Figure 6A:
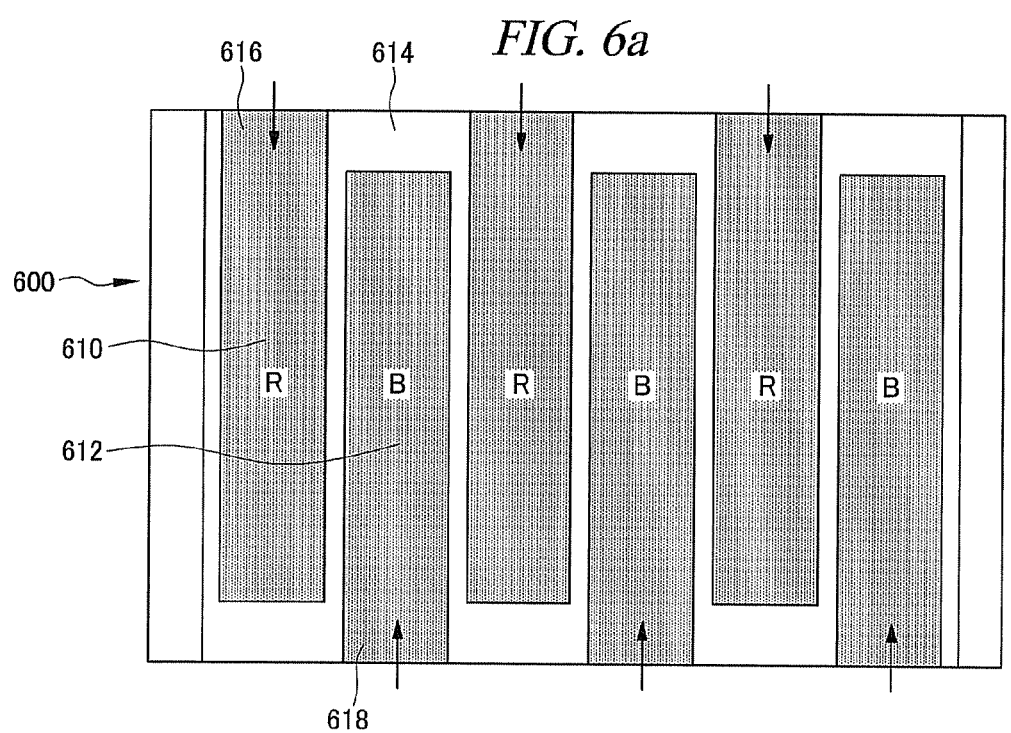
FIGS. 6a and 6b illustrate a method of injecting a liquid crystal into a liquid crystal panel in accordance with another illustrative embodiment.
Figure 6B:
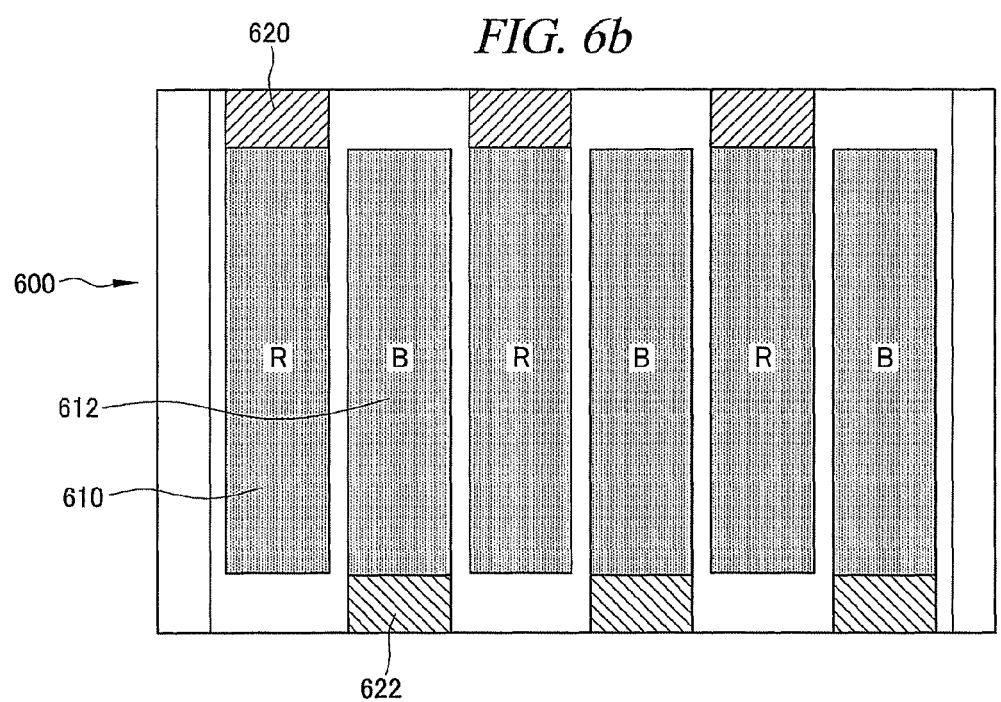

FIGS. 6a and 6b illustrate a method of injecting a liquid crystal into a liquid crystal panel in accordance with another illustrative embodiment.

In the illustrative embodiment depicted in FIGS. 5a to 5c, the injection openings for injecting the respective liquid crystal materials are provided on the same side of the liquid crystal panel, and, thus, the cutting process needs to be performed. In order to solve this problem, in the present illustrative embodiment, injection openings for injecting liquid crystal materials are opposite each other and a process can be simplified.

A second liquid crystal panel 600 includes spaces 610 and 612 into which respective liquid crystal materials are to be injected. The spaces 610 and 612 are divided by a partition wall 614. In this case, injection openings 616 of the spaces 610 are provided on one side of the second liquid crystal panel 600 and injection openings 618 of the spaces 612 are provided on the other side of the second liquid crystal panel 600 so as to be opposite each other. With this configuration, the injection openings 616 of the spaces 610 and the injection openings 618 of the spaces 612 can be provided so as not to be adjacent to each other.

Thus, as depicted in FIG. 6b, right after the process of injecting the respective liquid crystal materials, a sealing process using sealants 620 and 622 can be performed without a cutting process. That is, after a liquid crystal material is injected into the spaces 610, a sealing process using the sealant 620 can be performed, and after a liquid crystal material is injected into the spaces 612, a sealing process using the sealant 622 can be performed. In this case, the liquid crystal materials may be injected into the respective spaces at the same time or the respective spaces may be sealed at the same time.

In this way, liquid crystal materials displaying different colors can be respectively injected into a liquid crystal panel.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

What is claimed is:

1. A reflective liquid crystal display device comprising:
a first liquid crystal panel containing a first liquid crystal material that reflects light of a first color;
a second liquid crystal panel containing a second liquid crystal material that reflects light of a second color and a third liquid crystal material that reflects light of a third color, the second and third liquid crystal materials positioned to be separated from each other; and
a light absorption layer that is bonded to a lower surface of the second liquid crystal panel,
wherein the second liquid crystal panel is bonded to a lower surface of the first liquid crystal panel, and
the first to third liquid crystal materials reflect light in a planar state and transmit light in a focal conic state.

2. A reflective liquid crystal display device comprising:
a first liquid crystal panel containing a first liquid crystal material that reflects light of a first color;
a second liquid crystal panel containing a second liquid crystal material that reflects light of a second color and a third liquid crystal material that reflects light of a third color, the second and third liquid crystal materials positioned to be distinct from each other; and
a light absorption layer that is bonded to a lower surface of the first liquid crystal panel,
wherein the first liquid crystal panel is bonded to a lower surface of the second liquid crystal panel, and
the first to third liquid crystal materials reflect light in a planar state and transmit light in a focal conic state.

3. The reflective liquid crystal display device of claim 1, wherein the first liquid crystal panel includes:
a first substrate;
a first electrode and a second electrode that are bonded to a lower surface of the first substrate and positioned to face each other; and
a second substrate that is bonded to a lower surface of the second electrode,
wherein the substrates and the electrodes are transparent, and
the first liquid crystal material fills a gap between the first electrode and the second electrode.

4. The reflective liquid crystal display device of claim 2, wherein the first liquid crystal panel includes:
a first substrate;
a first electrode and a second electrode that are bonded to a lower surface of the first substrate and positioned to face each other; and
a second substrate that is bonded to a lower surface of the second electrode,
wherein the substrates and the electrodes are transparent, and
the first liquid crystal material fills a gap between the first electrode and the second electrode.

5. The reflective liquid crystal display device of claim 1, wherein the second liquid crystal panel includes:
a first substrate;
a first electrode and a second electrode that are bonded to a lower surface of the first substrate and positioned to face each other;
one or more partition walls positioned between the first electrode and the second electrode to separate the second liquid crystal material from the third liquid crystal material; and
a second substrate that is bonded to a lower surface of the second electrode,
wherein the substrates and the electrodes are transparent, and
adjacent spaces of spaces divided by the partition walls are filled with liquid crystal materials that reflect lights of different colors.

6. The reflective liquid crystal display device of claim 2, wherein the second liquid crystal panel includes:
a first substrate;
a first electrode and a second electrode that are bonded to a lower surface of the first substrate and positioned to face each other;
one or more partition walls positioned between the first electrode and the second electrode to separate the second liquid crystal material from the third liquid crystal material; and
a second substrate that is bonded to a lower surface of the second electrode,
wherein the substrates and the electrodes are transparent, and
adjacent spaces of spaces divided by the partition walls are filled with liquid crystal materials that reflect lights of different colors.

7. The reflective liquid crystal display device of claim 3, wherein the liquid crystal material is switched from a planar state/a focal conic state to the focal conic state/the planar state depending on a voltage applied to the first electrode and the second electrode.

8. The reflective liquid crystal display device of claim 5, wherein the liquid crystal material is switched from a planar state/a focal conic state to the focal conic state/the planar state depending on a voltage applied to the first electrode and the second electrode.

9. The reflective liquid crystal display device of claim 1, wherein the first color to the third color are one of R (Red), G (Green), and B (Blue) and respectively have different colors.

10. The reflective liquid crystal display device of claim 1, wherein the first color to the third color are one of C (Cyan), M (Magenta), and Y (Yellow) and respectively have different colors.

11. The reflective liquid crystal display device of claim 1, wherein the first liquid crystal material to the third liquid crystal material are formed of a cholesteric liquid crystal material.

12. A manufacturing method of a reflective liquid crystal display device, the manufacturing method comprising:
(a) injecting, into a first liquid crystal panel, a first liquid crystal material that reflects light of a first color;
(b) injecting, into a second liquid crystal panel having a space divided by a plurality of partition walls, a second liquid crystal material that reflects light of a second color and a third liquid crystal material that reflects light of a third color; and
(c) bonding the second liquid crystal panel to a lower surface of the first liquid crystal panel.

13. The manufacturing method of claim 12, further comprising:
bonding a light absorption layer to a lower surface of the second liquid crystal panel.

14. A manufacturing method of a reflective liquid crystal display device, the manufacturing method comprising:
(a) injecting, into a first liquid crystal panel, a first liquid crystal material that reflects light of a first color;
(b) injecting, into a second liquid crystal panel having a space divided by a plurality of partition walls, a second liquid crystal material that reflects light of a second color and a third liquid crystal material that reflects light of a third color; and
(c) bonding the second liquid crystal panel to an upper surface of the first liquid crystal panel.

15. The manufacturing method of claim 14, further comprising:
bonding a light absorption layer to a lower surface of the first liquid crystal panel.

16. The manufacturing method of claim 12, wherein (b) the injecting process includes:
(b1) injecting the second liquid crystal material through an injection opening of a first space divided by the partition wall of the second liquid crystal panel;
(b2) sealing the injection opening of the first space;
(b3) injecting the third liquid crystal material through an injection opening of a second space divided by the partition wall of the second liquid crystal panel; and
(b4) sealing the injection opening of the second space,
wherein the first space and the second space are adjacent to each other with the partition wall interposed therebetween and are elongated in parallel with each other, and
the injection opening of the first space is provided on one side of the second liquid crystal panel and the injection opening of the second space is provided on the other side opposite the one side of the second liquid crystal panel.

17. The manufacturing method of claim 12, wherein (b) the injecting process includes:
(b1) injecting the second liquid crystal material through an injection opening of a first space divided by the partition wall of the second liquid crystal panel;
(b2) sealing the injection opening of the first space;
(b3) cutting a part of the second liquid crystal panel to open an injection opening of a second space divided by the partition wall of the second liquid crystal panel;
(b4) injecting the third liquid crystal material through an injection opening of the opened second space; and
(b5) sealing the injection opening of the second space,
wherein the first space and the second space are adjacent to each other with the partition wall interposed therebetween and are elongated in parallel with each other, and
in (b3) the cutting process, a part of the sealed first space is cut off.

18. The manufacturing method of claim 12, wherein the first color to the third color are one of R (Red), G (Green), and B (Blue) and respectively have different colors.

19. The manufacturing method of claim 12, wherein the first color to the third color are one of C (Cyan), M (Magenta), and Y (Yellow) and respectively have different colors.

20. The manufacturing method of claim 12, wherein the first liquid crystal material to the third liquid crystal material are formed of a cholesteric liquid crystal material.

* * * * *